Patented Jan. 25, 1938

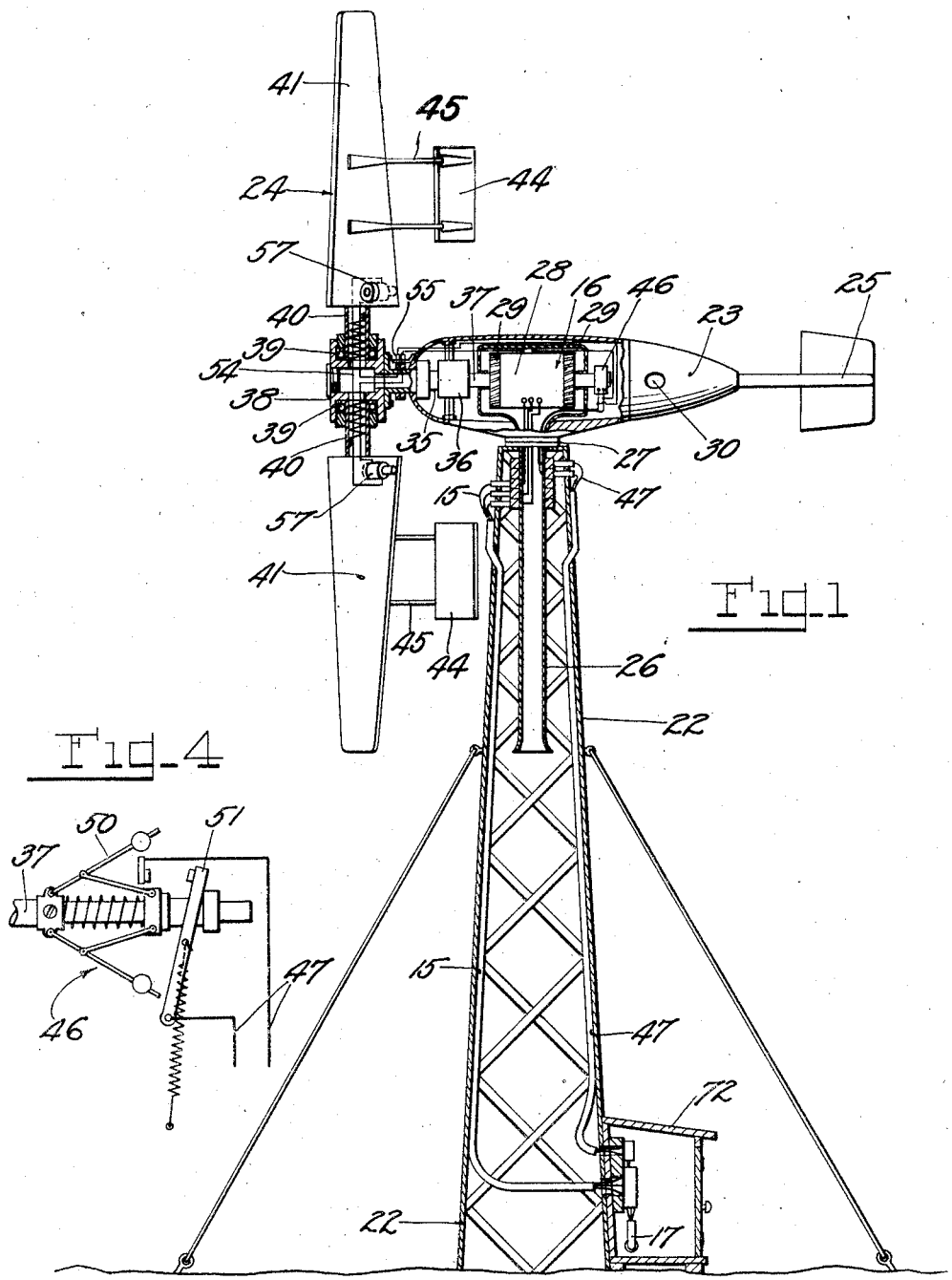

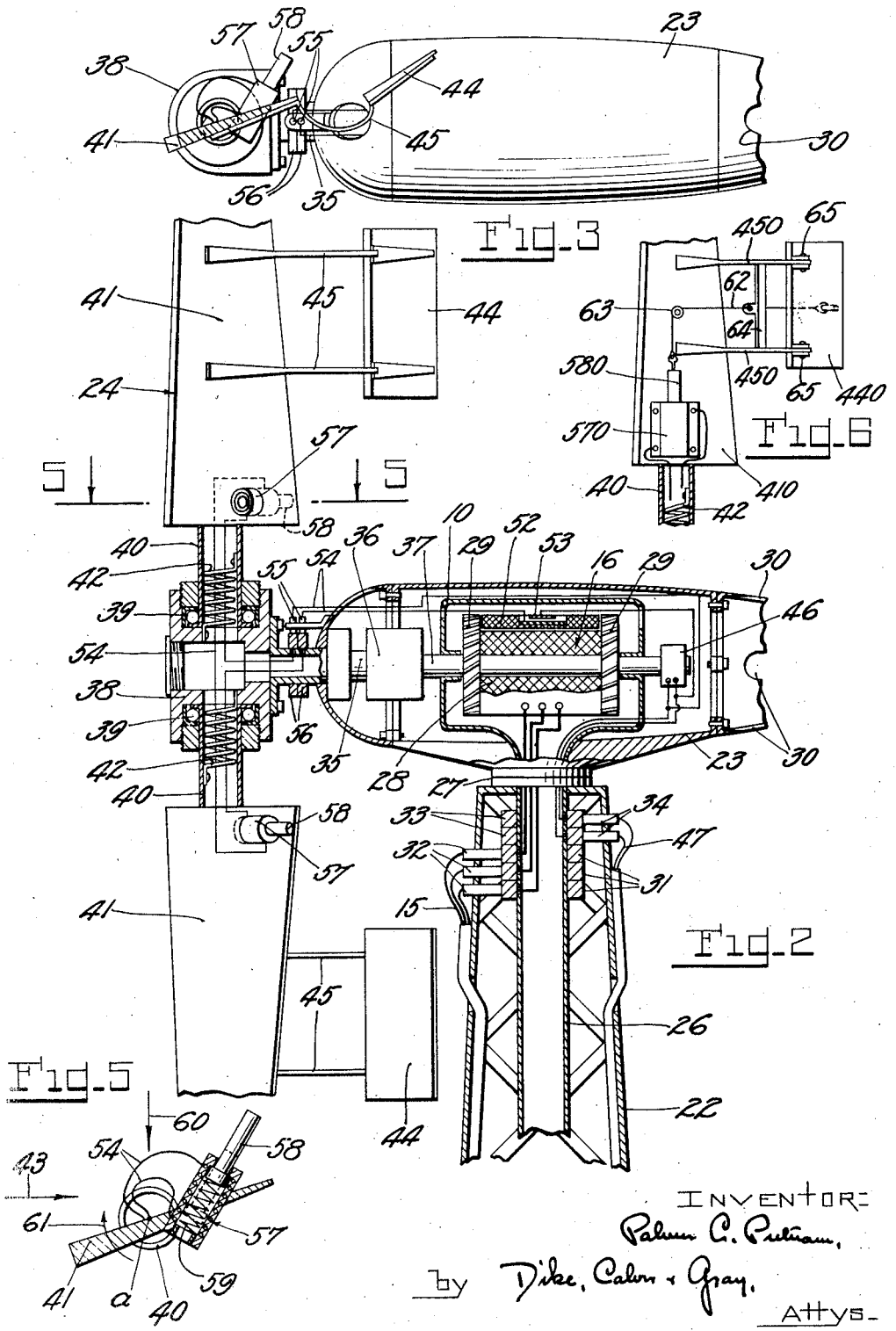

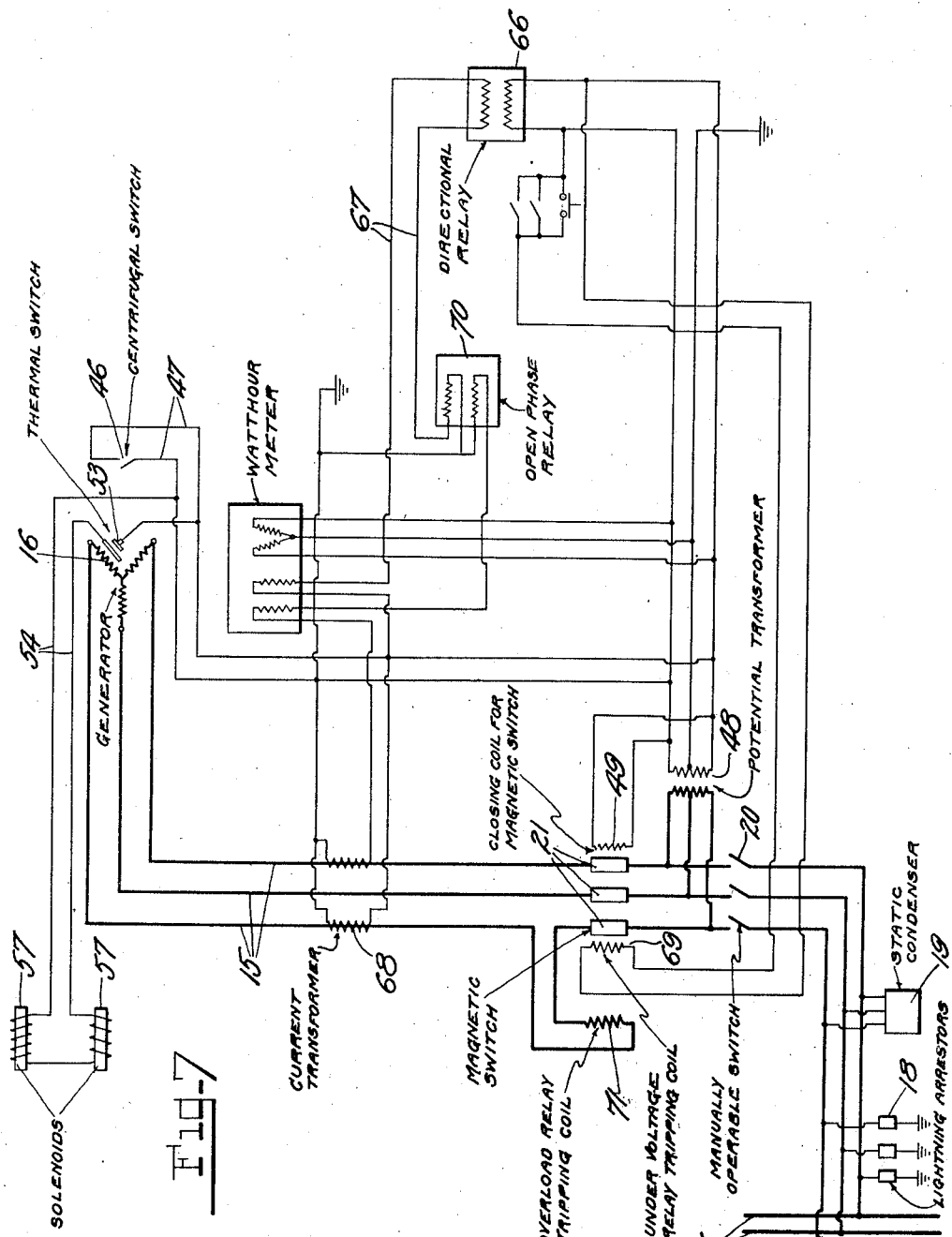

2,106,557

UNITED STATES PATENT OFFICE 2,106,557

AERO-ELECTRIC GENERATION SYSTEM

Palmer C. Putnam, Harwich, Mass.

Application June 22, 1935, Serial No. 27,917
Renewed December 7, 1937

5 Claims. (Cl. 290—44)

This invention relates to the generation of electric energy by the power of the wind, and especially to the utilization of this principle for the operation of feeder or sub-stations for adding energy directly to a main high tension alternating current power line.

While attempts have heretofore been made to utilize wind power for the generation of electric energy, such attempts have not met with any considerable practical success due to their failure to solve successfully certain problems peculiar to this class of power and especially to its application for the particular purpose in question. These problems center around the variable nature of the forces to be dealt with and the difficulties involved in the efficient utilization of these forces without the necessity of storage, injury to the installation, or loss of much of the power available. In average localities wind velocities may vary from time to time from zero to 50 or 60 miles per hour or more, and even within this range are apt to fluctuate momentarily between relatively wide limits, the force being received in the form of short gusts of relatively high velocity separated by periods of relative calm. Bearing in mind the fact that the energy of the wind varies as the cube of its velocity, it will be understood that the average power developed by a variable wind over a given period is derived largely from the intermittent gusts, and that unless the power of these gusts can be substantially utilized, a very considerable part of the available energy is lost. However, in the utilization of wind power for electric generation it is necessary that provision be made to prevent injury to the generator by overloading of the latter beyond its permanent and temporary capacity, and also to prevent "motoring" of the generator and consequent loss from the main power line during periods of relative calm. For these reasons it has heretofore been found impossible to utilize a sufficiently large percentage of the available energy of the wind to justify such installations economically.

The present invention has for an important object to overcome the above difficulties and to provide an installation of this character which will effectually and efficiently utilize the gust power of the wind, as well as a portion at least of the energy of winds of excessively high velocities, without danger of injury to the generator or other equipment and without loss of energy from the main power line. In accordance with one feature of the invention advantage is taken of the fact that generators of certain types are capable of accepting and utilizing a considerable temporary or momentary overload which they are incapable of withstanding for an indefinite length of time, their capacity in this respect depending upon the amount of overload and the duration of its application. In accordance, therefore, with this feature of the invention, means are provided whereby a wind motor mechanically connected to drive a generator, which in turn is connected to feed electric energy to the main power line, may be so controlled, in accordance with the velocity of the wind and the quantity-time factor of the overload on the generator, as to take advantage of the gust power of the wind to generate a maximum contribution of power to the main line without loss of energy from the latter or injury to the installation. In accordance with another feature of the invention provision is made for "spilling" the excess power of wind of high velocity when the maximum power input of the generator is reached. The invention also contemplates the provision of certain other controls whereby the above objects are accomplished and the installation otherwise rendered efficient while guarded against injury or improper operation.

The foregoing and other objects of the invention, together with means whereby the latter may be carried into effect, will best be understood from the following description of certain embodiments thereof illustrated in the accompanying drawings. It will be understood, however, that the particular constructions and arrangements described and shown have been chosen for purposes of exemplification merely, and that the invention, as defined by the claims hereunto appended, may be otherwise embodied without departure from its spirit and scope.

In said drawings:

Fig. 1 is a vertical section, partly in elevation, of a complete installation or unit.

Fig. 2 is a similar view on an enlarged scale of the instrumentalities shown in the upper portion of Fig. 1.

Fig. 3 is a plan view, partly in horizontal section.

Fig. 4 is a detail elevation of the centrifugal switch.

Fig. 5 is a detail sectional view taken substantially on the line 5—5 of Fig. 2.

Fig. 6 is a fragmentary detail view illustrating a modification to be referred to.

Fig. 7 is a wiring diagram.

Referring to Fig. 7, there is shown a branch power line 15 connecting a three-phase induction generator 16 with a main power line 17, the branch line 15 preferably including lightning arrestors 18, a static condenser 19, and a manually operable main switch 20 by which the sub-station can at will be thrown into and out of operation, and also including a magnetic switch 21, which is automatically controlled, as hereinafter described, to connect the generator 16 with the main power line and disconnect the same therefrom.

Referring to Figs. 1 and 2, the installation comprises a hollow mast or tower 22 upon the top of which is mounted for rotation about a vertical axis a casing 23 enclosing the generator 16 and carrying at its forward end a wind motor or mill 24 of the high speed propeller type, and at its rear end a tail vane 25 for holding the propeller in the proper position to receive the force of the wind. It will be understood that suitable means, not shown, of a conventional and well-known type may be employed to swing the tail vane 25 into a position parallel with the plane of rotation of the propeller or wheel 24 in order to turn the whole unit out of the wind for purposes of repair or otherwise.

The casing 23 is mounted on the top of the mast or tower 22 on a turntable 27 through which extends downwardly into the tower a hollow vertical shaft or ventilation pipe 26 leading from an inner casing 10 enclosing the generator 16. The armature 28 of the generator is provided with fans 29 for drawing air upwardly through the pipe 26 and discharging it through suitable openings 30 in the rear of the casing 23 in order to cool the generator. The shaft or pipe 26 carries slip rings 31 cooperating with brushes 32 by which the circuit through the branch power line 15 is maintained, and with other slip rings 33 cooperating with brushes 34 to carry a control circuit hereinafter described.

The wind wheel or propeller 24 is carried by a shaft 35 journalled in a suitable bearing at the front of the casing 23 and connected by step-up gearing 36 with the armature shaft 37 of the generator 16, the gear ratio being preferably approximately 1 to 45, so that a wind wheel speed of, for example, 40 R. P. M. will result in an armature shaft speed of 1800 R. P. M.

The wind wheel or propeller 24 comprises a hub 38 having thrust bearings 39 in which are rotatably mounted the hollow stems 40 of the blades or wings 41, the axes of said stems being radial to the hub and in the plane of rotation with the wheel. Said stems 40 are connected with the hub 38 by torsion springs 42 tending normally to hold said blades at a predetermined angle to the direction of the wind indicated by the arrow in Fig. 5. Each wing 41 carries at its trailing edge an aileron 44 held spaced therefrom by struts 45. The ailerons 44 are set at such an angle in excess of that of the blades as to develop a force tending to rotate the blades about the axes of the spindles 40 in opposition to the springs 42, thereby reducing the angles of said blades to the direction of the wind when the energy input exceeds a certain predetermined maximum, and the generator has reached the maximum speed of which it is capable, thereby tending to reduce the amount of wind energy absorbed by the blades. In this manner the maximum power applied to the generator by the wind wheel is limited to the maximum overload which the generator is capable of taking irrespective of the velocity of the wind. Furthermore if there is no power in the main line the ailerons will, by change of pitch, prevent racing of the wheel. In other words they limit both the torque and speed of rotation.

Mounted on the armature shaft 37 of the generator is a centrifugal switch 46 controlling a low voltage circuit 47 (see also Fig. 7) energized through a potential transformer 48 from the power line 15 and carried through the slip rings 33 and brushes 34. The circuit 47 includes the closing coil 49 of the magnetic switch 21, so that when the centrifugal switch is closed the magnetic switch will likewise be closed to connect the generator, through the branch line 15, with the main line 17. The centrifugal switch 46 may be of any suitable or well-known form, but as shown in Fig. 4 comprises a centrifugal governor 50 operating a snap-over switch 51. The arrangement is preferably such that the switch will close at one speed of rotation, say 1810 to 1825 R. P. M. and open at a slightly lower speed, say 1800 R. P. M. thereby preventing "hunting" or intermittent opening and closing at a critical point.

Located in the field winding 52 of the generator 16 is a temperature controlled circuit closing device or thermal switch 53 controlling a shunt circuit 54 leading from the circuit 47 between the centrifugal switch 46 and the transformer 48. The thermal switch 53 may be of any suitable type, such as a relay controlled by a thermo-couple, but preferably is of the type commercially known as the Westinghouse "Thermo-guard", which comprises a thermo-sensitive concavo-convex bimetallic disk adapted to close the circuit at a temperature of, say 75° C. and open it at a lower temperature of, say 60° C. thereby preventing hunting at any particular critical temperature. The circuit 54 is led through brushes 55 on the casing 23 and slip rings 56 on the propeller shaft 35 to solenoids 57 on the blades 41.

The solenoids 57 have weighted cores 58 normally held in the position shown in full lines in Fig. 5 by springs 59 but which, when the solenoids are energized, are moved into the position shown in dotted lines in said figure, thereby changing the positions of the centers of gravity of the blades 41 with respect to the axes of rotation $a$ of the stems 40. This change in the location of the centers of gravity varies the turning moment of the blades about said axes resulting from the combined action of the springs 42 and the inertia of the blades in opposition to their rotary movement in the direction of the arrow 60 about the axis of the shaft 35, and produces a tendency to turn about the stem axes $a$ in the direction of the arrow 61, thereby decreasing the pitch or angle of attack of said blades and consequently reducing the ratio of the power output of the propeller to the wind velocity.

A modified arrangement is shown in Fig. 6 wherein the core 580 of the solenoid 570 is connected by a cord or cable 62, passing about a pulley 63 on the blade 410 and through a guide 64 carried by the struts 450, with the aileron 440 which, in this instance, is hinged at 65 to the ends of the struts. Consequently, when the solenoid 570 is energized the angle of attack of the aileron 440 is increased, causing said aileron 440 in turn to cooperate with the spring 42 to change the pitch of the blade 440 and reduce the angle of attack of the latter.

The operation of the mechanism as thus far described is as follows:

Assuming that the wind is light or blowing at a velocity below that at which the sub-station can contribute power to the main line, say, for example, ten miles per hour, the centrifugal switch 46 remains open and the propeller and generator armature idle at a speed which increases as the velocity of the wind increases. When an armature speed of, say, 1810 or 1825 R. P. M. is attained, the centrifugal switch closes the circuit 47, thereby energizing the closing coil 49 which in turn closes the magnetic switch 21 throwing the generator onto the main line. If the velocity of the wind increases to a point which results in an overload on the generator, the temperature of the field windings of the latter rises. If this increase in velocity is in the form of a temporary gust, this temperature increase is negligible. If, however, the high velocity persists or the gusts become rapidly recurrent, the temperature of the field windings continues to rise and when it reaches a predetermined value, say 75° C., the thermal switch 53 closes the circuit 54 to the solenoids 57. Said solenoids are thereby energized, causing the blades to alter their pitch, by rotation about the axis of the stems 40, thus decreasing the angle of attack, so that less energy is absorbed and the output of the generator is reduced.

The load or output of the generator having been reduced, the temperature of the windings falls, and when it reaches a predetermined value of, say 60° C., the thermal switch 53 opens the circuit 54, the solenoids are deenergized, and the blades returned to their original pitch, thereby stepping up the output of the generator. If the velocity of the wind falls to such a point, say ten miles per hour, that the generator is no longer adding energy to the main power line, in other words, if its speed falls below a predetermined value, say 1800 R. P. M., the centrifugal switch 46 opens the circuit 47 through the closing coil 49, whereupon the magnetic switch 21 opens and throws the generator off the line, thus preventing motoring.

If, on the other hand, the wind velocity continues to rise after the angle of the blades has been changed to reduce the output of the generator, the ailerons will, as above explained, act to reduce still further the angle of attack of the blades and thereby spill the excess input power. The relationship between the ailerons and the blades is such that no wind velocity can impart to the blades more than a predetermined maximum amount of energy, determined by the maximum speed at which the generator can be operated, irrespective of the temperature of the generator windings, although this upper limit may in turn be lowered as a function of the temperature of the windings, so that in cold weather the energy from winds of higher velocity can be accepted, up to the absolute limit imposed by the maximum generator speed and by the fixed aileron angle, in the arrangement shown in Figs. 2 and 3, or the maximum aileron angle, in the arrangement shown in Fig. 6. From the foregoing it will be seen that the energy of a momentary gust can be accepted, even though the energy exceeds the permissible continuous overload of the generator, due to the fact that the gust is of momentary duration and consequently the temperature of the generator windings does not have time to increase to the point which will close the thermal switch 53 and cause a change in the pitch of the blades, so that the energy of such gusts below the absolute limit above referred to can be absorbed without danger or damage to the sub-station.

In order to prevent reversal in the direction of flow of power and consequent motoring in the event of failure of the centrifugal switch 46 to open the circuit 47 when the velocity of the wind falls, a directional relay 66 is preferably provided in a circuit 67 energized through a current transformer 68 from the branch line 15, said circuit operating an under voltage tripping coil 69 which opens the magnetic switch 21.

Should an open circuit occur in any one of the three phases of the generator, an open phase relay 70, likewise included in the circuit 67, will also act through the under voltage tripping coil 69 to open the magnetic switch. Protection against overload is provided by an overload relay having a tripping coil 71 likewise acting to open the magnetic switch 21. The overload relay is a thermal relay which preferably acts at a temperature of approximately 78° C.

All of the controlling devices above referred to, with the exception (in the particular arrangement shown) of the centrifugal switch 46 and thermal switch 53, may conveniently be located in a control house 72 at the foot of the mast or tower. If desired, the generator itself, together with the centrifugal switch and thermal switch, may likewise be located in said control house or elsewhere at the foot of the tower and connected with the wind motor by suitable power transmitting connections, as will be obvious without further description in detail.

I claim:
1. In an electric generating system, in combination, a propeller type wind motor having a blade of variable angle of attack, an electric generator driven by said motor, said generator having windings and means controlled by the temperature of said windings for changing the angle of attack of said blade.

2. In an electric generating system, in combination, a propeller type wind motor having a blade mounted to turn about an axis radial to the axis of rotation of the motor to vary the angle of attack of said blade, a spring tending to hold said blade to a predetermined angle of attack, an electric generator driven by said motor, an electric circuit including a solenoid carried by said blade and adapted when energized to change the position of the center of gravity of said blade relative to said radial axis, and means controlled by the load on said generator for controlling said circuit.

3. In an electric generating system, in combination, a propeller type wind motor having a blade mounted to turn about an axis radial to the axis of rotation of the motor to vary the angle of attack of said blade, a spring tending to hold said blade to a predetermined angle of attack, an electric generator driven by said motor, said blade having a trailing edge, a pivoted aileron carried by and spaced from said trailing edge, and a solenoid carried by said blade and connected with said aileron to turn the latter about its pivot and thereby change the angle of attack thereof when said solenoid is energized.

4. In an electric generating system, the combination with a propeller type wind motor having a hub and a blade mounted to turn thereon about an axis radial to said hub, and a spring tending to hold said blade to a predetermined angle of attack, of an induction generator geared to said motor, said blade having a trailing edge and an aileron carried by and spaced from said trailing edge and having an angle of attack greater than that of said blade.

5. In an electric generating system, in combination, a propeller type wind motor having a blade of variable angle of attack, an electric generator driven by said motor, and means controlled by the temperature of said generator for changing the angle of attack of said blade.

PALMER C. PUTNAM.